July 26, 1966  F. G. F. BEHLES  3,262,711
AUTOMATIC CONTROL MECHANISM FOR MAINTAINING THE BODY OF
AN AUTOMOBILE AT A CONSTANT LEVEL
Filed April 2, 1964
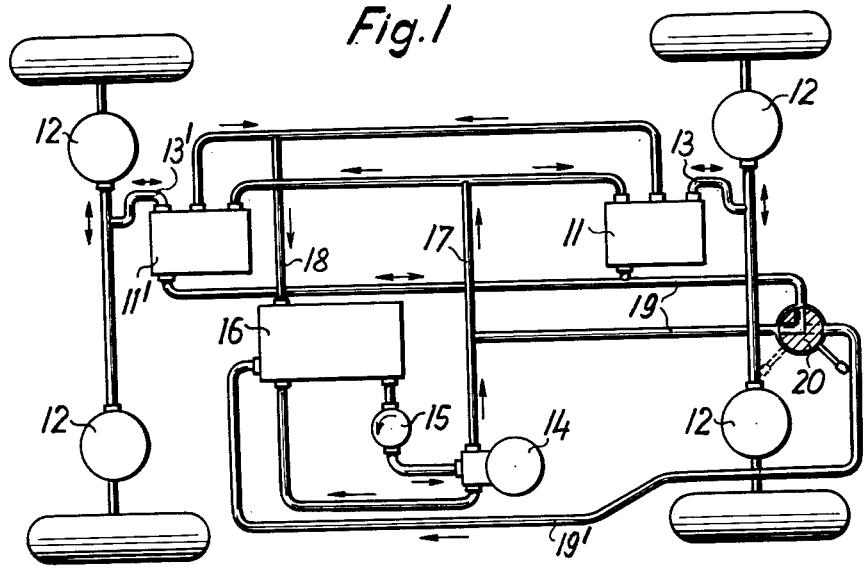
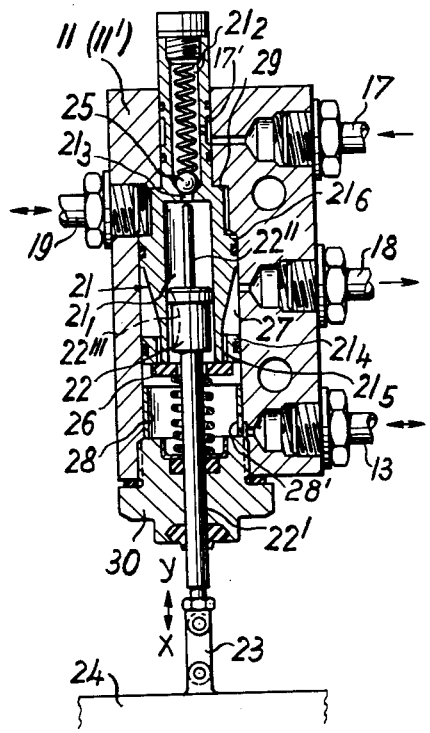
INVENTOR
Franz G. F. Behles
BY Dicke & Craig
ATTORNEYS United States Patent Office 3,262,711
Patented July 26, 1966

3,262,711
AUTOMATIC CONTROL MECHANISM FOR MAINTAINING THE BODY OF AN AUTOMOBILE AT A CONSTANT LEVEL
Franz G. F. Behles, Ingolstadt, Germany, assignor to Daimler-Benz Aktiengesellschaft, Stuttgart-Unterturkheim, Germany
Filed Apr. 2, 1964, Ser. No. 356,780
Claims priority, application Germany, Apr. 4, 1963, D 41,281
7 Claims. (Cl. 280—6.1)

The present invention relates to an automatic control mechanism for maintaining the body of an automobile at a constant level. More particularly, the invention relates to improvements in such automatic control mechanisms for automobiles in which the car body is supported relative to the wheel axles by oleo-pneumatic spring elements which by means of a pair of such control mechanisms for the front and rear axles are connected to a hydraulic line system under pressure which comprises a hydraulic-pneumatic pressure reservoir, an oil tank, a pump connected to said oil tank for filling this reservoir, feed lines connecting each control mechanism with the associated spring elements, feed lines connecting the pressure reservoir with the control mechanisms, and return lines leading from these mechanisms back to the oil tank. Each of these control mechanisms contains a control element which is moved in response to the changes in the distance between the car body and one of the wheel axles, and which is disposed between a pair of opposite check valves which are alternately actuated by the control element. Thus, when the control element is in one of two positions one of these valves forming a supply check valve is opened to connect the feed line coming from the pressure reservoir to the feed line leading to the respective spring elements so that pressure oil will be supplied to these spring elements, while the other valve, a return check valve, is closed. When the control element is in its other position, the return check valve is opened so that the return line which leads to the oil tank is then connected to the feed line leading to the spring elements so that pressure oil will be discharged from the spring elements, while the supply check valve is closed.

In the known control mechanisms of the above-mentioned type which operate in the manner as described, the control element which is operated in response to the changes in distance between the car body and the wheel suspension units, as well as the check valves which are actuated by this control element are mounted directly within the housing of the control mechanism and it is impossible to preselect a certain level of the car body by means of the control element. Such a control mechanism only permits a very undesirable operation, namely, the oleo-pneumatic spring elements to be completely filled and emptied by means of switch valves which are installed into direct lines leading, on the one hand, from the pressure reservoir to the spring elements and on the other hand, from the latter to the oil tank.

There is another type of apparatus known in which, aside from the usual control mechanisms for maintaining the car body at a constant level independently of the load, there are additional control means provided to permit a certain level of the car body to be preselected, for example, in order to facilitate the loading and unloading of the car body. When these additional control means which are operated by hand are switched on, they supersede the usual control mechanisms and render the same inoperative.

It is an object of the present invention to provide a control mechanism of the above-mentioned type which is designed so as to permit the level of the car body to be preselected without requiring any additional control means or the like.

For attaining this object, the present invention provides a control mechanism in which the control element is slidably mounted within a tubular slide member which, in turn, is longitudinally slidable within the housing of the mechanism and adapted to carry out several functions, namely, in association with two fixed stops in the housing to permit a certain lower and upper level of the car body to be preselected and also to operate and form a part of the supply check valve and the return check valve.

Another feature of the invention consists in dividing the mentioned tubular slide member into two chambers which are connected with each other by a bore which forms the seat of the supply check valve in one of the chambers which is connected to the feed line coming from the pressure reservoir. The second chamber contains the control element in the form of a piston which is provided with passages and has a pin projecting from its one end which is adapted to pass through the mentioned bore to open the supply check valve in the first chamber, while the other end of this piston is adapted to open the return check valve which, when closed, engages under spring pressure against a flange on the tubular slide member at the other end of the second chamber.

The tubular slide member is adjusted according to the invention by pressure oil which is selectively supplied from the pressure reservoir or from the pressure-line system and acts upon one side of the slide member so as to shift the same against the opposing action of the pressure of the spring elements which also prevails at the other side of the slide member.

By providing a single valve unit which is adapted to carry out the various functions as described above, the entire construction and assembly of the control mechanism according to the invention is considerably simplified, especially by reducing the number of separate elements or units which were previously required.

The features and advantages of the present invention will become more clearly evident from the following detailed description thereof which is to be read with reference to the accompanying drawings, in which FIGURE 1 shows a circuit diagram of the hydraulic pneumatic control system of an automobile; while FIGURE 2 shows a longitudinal section of an individual control unit according to the invention.

As illustrated diagrammatically in FIGURE 1, the front and rear axles of an automobile are provided with separate control units 11 and 11' of the inventive design as shown in detail in FIGURE 2. The car body is supported on the front and rear axles by separate oleo-pneumatic spring elements 12 which are supplied from the control units 11 and 11' by feed lines 13 and 13'. The two control units 11 and 11' are, in turn, supplied with pressure oil through a pressure feed line 17 from a pressure reservoir 14 which is charged with pressure by a pump 15 which draws the oil from an oil tank 16. A return line 18 leads from the control units 11 and 11' back to the oil tank 16. The control units 11 and 11' are further connected to a conduit 19, hereafter called the level preselection line, which branches off from the feed line 17 and contains a switch mechanism, for example, in the form of a three-way valve 20 from which a return line 19', hereafter called the level return line, leads back to the oil tank 16.

As shown in FIGURE 2, each control unit 11 and 11' contains a tubular slide member 21 which is slidable longitudinally in the housing of the respective control unit and contains a control piston 22 at the upper end of a piston rod 22' which is connected to the front or rear axle 24 by a connecting member 23 or other suitable means. The tubular slide member 21 also contains a supply check valve 25 and a return check valve 26. The valve member 26 is opened by the lower end of the control piston 22, while the supply check valve 25 is opened by a pin 22″ on the upper end of the piston 22. The slide member 21 is divided into two chambers $21_1$ and $21_2$ which are connected by a bore $21_3$ which is normally closed by the valve member 25 in chamber $21_2$. Chamber $21_2$ is connected to the feed line 17 by a passage 17′ provided within slide member 21. Feed line 17 extends from the pressure reservoir 14. Chamber $21_1$ contains the control piston 22 in which lateral grooves 22‴ are provided for the passage of pressure fluid from one side of the piston to the other. The lower end of the slide member 21 is provided with a flange $21_4$ which serves as a valve seat for the valve member 26 of the return check valve and contains bores $21_5$ which are opened and closed by the valve member 26 and terminate into an annular chamber 27 which communicates with the return line 18 leading to the oil tank 16. Slide member 21 is further provided with a flange $21_6$ the purpose of which will become evident from the subsequent description.

The mode of operation of each of the control units 11 and 11′ is as follows:

Assuming that at first the slide member 21 is in the normal upper position, as illustrated in FIGURE 2, which corresponds to a preselected lower level of the car body, the housing of the control unit 11 or 11′ which is secured to the car body will be moved in the direction of the arrow X when the car is weighted down either by the entry of passengers or by any other load. The supply check valve 25 is then opened by the pin 22″ on the control piston 22 so that the pressure oil can pass through the feed line 17 and the chambers and channels in the slide member 21 and then through the feed line 13 to the spring elements 12 which then elevate the car body back to its original level, whereupon the supply check valve 25 is again closed.

When the car is being unloaded, the car body moves in the direction of the arrow Y, whereby the return check valve 26 is opened by the lower end of the valve piston 22 so that the pressure oil flows from the spring elements 12 through the feed line 13, the bores $21_5$, and the return line 18 back to the oil tank 16 until the car body has again reached its preselected lower level.

If the car body is at first to be adjusted to a higher level, the flange $21_6$ of slide member 21 which forms an annular piston surface is acted upon by pressure oil coming from the pressure reservoir 14 in which a considerably higher pressure prevails than in the spring elements 12. This is effected by turning the three-way valve 20 to the position shown in FIGURE 1 in full lines which permits the pressure oil to pass through both branches of the level-preselection line 19 to the control units 11 and 11′ in each of which it forces the slide member 21 downwardly against the oil pressure in the spring elements 12. By this downward movement of the slide member 21 the supply check valve 25 is also opened by pin 22″ so that pressure oil can pass through the feed line 17 to the line 13 and then to spring elements 12 and the car body will thereby be lifted to an extent which is determined by the engagement of the flange $21_4$ on the lower end of slide member 21 with a spacing sleeve 28 which is slotted to form a passage 28′ for the oil to and from line 13. Spacing sleeve 28 is removably secured to a nut 30 which closes and seals the lower end of the housing of the control unit. In order to vary the upper level of the car body it is therefore only necessary to insert a spacing sleeve 28 of a different length, or to insert a sealing ring of a different thickness between nut 30 and the housing. Of course, the slide member 21 may also be adjusted by suitable means other than those described.

If the car body is to be set back from its higher upper level to the level in accordance with the position of the control unit 11 or 11′ as illustrated in FIGURE 2, the three-way valve 20 is turned to the position as indicated in FIGURE 1 in dotted lines, whereby the line 19 is connected to the level return line 19′. The pressure contained in the spring elements 12 and in line 13 then acts upon the slide valve 21 which is thereby forced back until it engages upon a fixed stop 29 in the valve housing. By this movement of slide valve 21 the return check valve 26 is also opened by engaging with the lower side of piston 22, which then remains in a fixed position, and by being thus lifted off its seat on valve 21. Pressure oil can then flow back from the spring elements 12 through the lines 13 and 18 to the oil tank 16 until the car body has again reached its predetermined lower level, whereupon the return check valve 26 is again closed.

Of course, if desired it is also possible to make the upper stop 29 adjustable so as to permit the lower level of the car body to be changed.

It is to be noted that FIGURE 1 is only a schematic representation of the control system of the invention, and that this system may be utilized with obvious modification with any vehicle axle arrangement.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In an automobile having a car body, front and rear axles having wheels thereon, oleo-pneumatic spring elements intermediate said car body and said axles, a hydraulic system having a pressure reservoir, an oil tank, a pump connected to said oil tank and said pressure reservoir for filling the latter, a first feed line connecting said control unit with the associated spring elements, a second feed line connecting said pressure reservoir with said control unit, and a return line connecting said control unit with said oil tank, the improvement essentially consisting of a pair of control units each associated with the spring elements on each of said axles, each of said control units comprising a housing secured to said car body, a tubular slide member slidable longitudinally within said housing, a control element slidable longitudinally within said slide member between two end positions including a connecting rod and a control rod, said connecting rod extending to the outside of said housing and connected to the associated axle and movable relative to said slide member and said housing in response to changes in the distance between said car body and said axle from one to the other of said end positions, stop means in said housing for limiting the movements of said slide member in opposite directions between upper and lower limits, a supply check valve and a return check valve within said slide member alternately actuated by said control element, spring means tending to maintain said valves in the closed position, said control element in one of said end positions having said control rod in contact with said supply check valve opening said supply check valve to connect said second feed line to said first feed line so as to supply pressure oil from said pressure reservoir to said spring elements on said associated axle while said return check valve is closed, said control element in the other of said end positions being in contact with said return check valve to open said return check valve connecting said first feed line to said return line so as to discharge pressure oil from said spring elements and to return said oil to said oil tank while said supply check valve is closed.

2. An apparatus as defined in claim 1, in which said tubular slide member is divided into two chambers connected by a bore, said supply check valve disposed within the first of said chambers and normally adapted to close said bore by the action of one of said spring means, said first chamber being connected to said second feed line coming from said pressure reservoir, said control element forming a piston slidable within the second chamber and having at least one passage therein leading from one end thereof to the other, said control rod projecting from one end of said piston and positioned with respect to said bore to pass through said bore to open said supply check valve upon movement of said control element to said one end position, the other end of said piston contacting said return check valve in the other end position of said control element to open said return check valve, said return check valve being formed by a valve member slidable along said rod and by a flange on one end of said slide member in sliding engagement with the inner wall of said housing and having at least one valve port leading from one side thereof to the other and upon opening of said valve, said valve port connecting one of said first feed lines to one of said return lines, said valve member being normally acted upon by one of said spring means to close said valve port.

3. An apparatus as defined in claim 2, in which an annular chamber is provided around said slide member between said flange on one end of said slide member and the part of said slide member near the other end thereof which slidably engages with the inner wall of said housing, said return line being connected to said housing so as to communicate with said annular chamber, said annular chamber communicating through said valve port in said flange with said first feed line leading to said spring elements when said return check valve is opened.

4. An apparatus as defined in claim 2, in which the part of said slide member containing said second chamber has a larger outer diameter than the part containing said first chamber, thus forming a shoulder adapted to engage upon a corresponding shoulder in said housing forming one part of said stop means determining the lower end level of said car body.

5. An apparatus as defined in claim 1, further comprising a control pressure line connecting one side of said pressure reservoir to said housing to apply pressure oil to a part of said slide member near one end thereof serving as a piston surface forcing said slide member to its lower limit to effect movement of said car body to its upper limit position, and means for lowering said car independently of its load including control valve means for selectively connecting said control pressure line to said oil tank.

6. An apparatus as defined in claim 5, in which said part comprises a reduced part on one end portion of said slide member adjacent to said supply check valve forming an annular piston surface between said reduced part and the maximum outer surface of said slide member which slidably engages with the inner wall of said housing.

7. An apparatus as defined in claim 5, in which said control valve comprises a three-way valve connected at one side to said second feed line coming from said pressure reservoir, at the second side to said other pressure line leading to said piston surface of said slide member, and at the third side to another return line leading to said oil tank whereby when said control valve is turned toward said third side, said slide member is moved back to its original position by the pressure prevailing in said spring elements and said first feed line and said car body is thus returned to its upper end level.

References Cited by the Examiner

UNITED STATES PATENTS

| | | |
|---|---|---|
| 2,939,723 | 6/1960 | Wisniewski. |
| 2,966,918 | 1/1961 | Kosmalski _____ 137—102 |
| 2,978,256 | 4/1961 | Bertsch. |
| 2,997,314 | 8/1961 | Hill. |
| 3,071,394 | 1/1963 | Miller _____ 280—124 |
| 3,074,739 | 1/1963 | Alfieri _____ 280—124 |

FOREIGN PATENTS 890,928   3/1962   Great Britain.

BENJAMIN HERSH, *Primary Examiner.*

LEO FRIAGLIA, *Examiner.*

W. A. MARCONTELL, *Assistant Examiner.*